United States Patent [19]
Kordts

[11] Patent Number: 4,793,187
[45] Date of Patent: Dec. 27, 1988

[54] CIRCUIT ARRANGEMENT FOR THE COMPENSATION OF TEMPERATURE-DEPENDENT AND TEMPERATURE-INDEPENDENT DRIFT AND FOR THE COMPENSATION OF THE SENSITIVITY OF A CAPACITIVE SENSOR

[75] Inventor: Jürgen Kordts, Wedel, Fed. Rep. of Germany

[73] Assignee: U.S. Philips Corp., New York, N.Y.

[21] Appl. No.: 62,919

[22] Filed: Jun. 16, 1987

[30] Foreign Application Priority Data

Jun. 18, 1986 [DE] Fed. Rep. of Germany ....... 3620399

[51] Int. Cl.⁴ .......................... G01L 9/12; G01L 19/04
[52] U.S. Cl. ......................................... 73/708; 73/724; 364/558; 364/571.03
[58] Field of Search .................... 73/708, 718, 724; 364/558, 571; 361/283; 331/65, 66

[56] References Cited

U.S. PATENT DOCUMENTS 4,683,754  8/1987  Terutaka et al. ....................... 73/708

Primary Examiner—Donald O. Woodiel
Attorney, Agent, or Firm—Bernard Franzblau

[57] ABSTRACT

A circuits for compensating temperature-dependent and temperature-independent drift of a capacitive sensor including two measuring capacitors (3, 4) comprises pulse duration demodulators (11, 12) in the relevant input circuits. In accordance with pulses supplied by oscillators and whose duration is proportional to the capacitance of the capacitors, a d.c. voltage ($U_O$) is applied to respective charging capacitors (17, 18) of the pulse duration demodulators (11, 12) for a predetermined period of time in order to charge this capacitors, after which zero potential is applied thereto in order to discharge the capacitors. The output of the relevant pulse duration demodulator is connected to the input (20, 21) of a summing/substraction member (19) whose output (23) supplies a d.c. voltage ($U_r$). A d.c. voltage ($U_O$), supplied by a controller (16) which compares one controller input d.c. voltage ($U_r$) with a fixed reference voltage ($U_{ref}$), is readjusted so that the d.c. voltage ($U_r$) at the output (23) of the summing/subtraction member equals the fixed d.c. reference voltage ($U_{ref}$) so that the output voltage ($U_a$) of the circuit is free of temperature-dependent and temperature-independent drift.

10 Claims, 3 Drawing Sheets

CIRCUIT ARRANGEMENT FOR THE COMPENSATION OF TEMPERATURE-DEPENDENT AND TEMPERATURE-INDEPENDENT DRIFT AND FOR THE COMPENSATION OF THE SENSITIVITY OF A CAPACITIVE SENSOR

BACKGROUND OF THE INVENTION

The invention relates to a circuit arrangement for the compensation of temperature-dependent and temperature-independent drift and for the compensation of the sensitivity of a capacitive sensor, which comprises two measuring capacitors whose capacitances are connected to at least one oscillator which outputs pulses having a duration which is proportional to the capacitance. The pulses arising from the respective capacitances appear in an alternating fashion. The invention also comprises a circuit for generating reference pulses from the pulses arising from the respective capacitances, the duration of the reference pulses being shorter than the duration of the pulses from the respective capacitances. The invention further comprises a pulse duration demodulator which is associated with a respective capacitance and which forms, from the pulses applied, a d.c. signal which corresponds to the relevant reciprocal value of a capacitance in that during a first period $t_{ref}$ which depends on the duration of a reference pulse a first reference signal is up-slope integrated and during a second period, after expiration of the reference pulse, a second reference signal is down-slope integrated. The invention also comprises an output subtraction member which forms the difference between the two output signals of the pulse duration demodulators.

An evaluation circuit for a capacitive sensor of this kind is described in German patent application No. P 35 28 416.1 (PHD 85-115); evaluation circuits of this kind are used, for example for determining the differential pressure, measured by a capacitive differential pressure measuring device, by evaluating the pressure-dependent capacitance variation of two measuring capacitors included in the differential pressure sensor. This evaluation circuit, however, exhibits a sensor-dependent drift of the zero point and the sensitivity in dependence on temperature variations.

In principle it is known (DE-OS No. 33 40 834) to realize compensation of zero point and sensitivity in a capacitive differential pressure sensor by converting the sensor capacitances $C_1$ and $C_2$ into a.c. voltages by means of integrators, the amplitude then being proportional to $1/C_1$ and $1/C_2$, respectively. In this known circuit arrangement, the temperature-dependent sensitivity of the sensor is compensated for by summing these a.c. voltages with a reference a.c. voltage which originates from a further integrator and which is formed by feeding back this sum signal to an oscillator which itself drives the integrators. The zero point can be corrected by summing and subtraction of the integrator voltages. This known circuit arrangement, however, operates only if the sensor information is present in the amplitude of the electric signal. However, when the sensor information is encoded in the pulse width or the frequency, as is the case in the evaluation circuit of the present kind, this known method of compensation cannot be applied due to the completely different way of operation of the relevant circuits.

SUMMARY OF THE INVENTION

Therefore, it is an object of the invention to provide a circuit arrangement whereby the pulse-duration modulated and suitably converted signals supplied by a capacitive differential pressure sensor can be converted into a d.c. voltage so that sensor-dependent drift can be compensated for.

This object is achieved in a circuit arrangement of the kind set forth in that one output of the pulse duration demodulators is connected to a respective input of a summing/subtraction member whose output supplies a controller, supplying the first reference signal, with an input d.c. signal. The d.c. signal of the controller output, which is connected to a further input of the summing/subtraction member and to a further input of the output subtraction member, is re-adjusted so that the controller input d.c. signal on the output of the summing/subtraction member is equal to a reference signal.

A circuit arrangement of this kind enables the conversion of pulse-width modulated sensor signals into a d.c. voltage signal so that on the one hand the temperature-dependent errors of the sensor can be compensated for and at the same time the output signal depending on the differential pressure can be linearized.

In a further elaboration of the invention, the input circuit of the pulse duration demodulators includes a respective electrically controllable switch which supplies, each time in accordance with the pulse duration of the oscillator output pulses, a charging capacitor of the pulse duration demodulator with the controller output d.c. voltage in order to charge this capacitor during a period $t_{ref}$ which depends on the duration of the reference pulse, and which applies zero potential thereto, after expiration of the period $t_{ref}$, in order to discharge this capacitor.

Preferably, in the connection between the controller output and the switches there is arranged an electrically controllable further switch whose rest contact carries zero potential and by means of which, using a pulse signal derived from the oscillators, the duration $t_{ref}$ of the charging and the duration of the discharging of the relevant charging capacitor can be determined by appropriate switching over. Thus, it is in principle possible to realize the electrically controllable switches and further switches as electronic switches.

In order to enable de-activation of the controller for trimming purposes, the controller is connected to a switch via which it can be switched on and off, so that the output voltage $U_o$ of the controller can be maintained at a constant value. Thus, for two different temperatures the output voltages of the relevant pulse demodulators can be measured in the no-load state and the loaded state of the sensor, so that the sensor-imposed temperature dependency of these output voltages can be taken into account.

In a preferred embodiment in accordance with the invention, the pulse duration demodulator comprises a low-pass filter which includes the charging capacitor and which consists of three successively connected filter elements, as well as an uncoupling amplifier which has a high input resistance and which consists of a non-inverting operational amplifier, the high-ohmic input resistance ensuring that the charging capacitor cannot be discharged via the uncoupling amplifier.

Preferably, the summing/subtraction member comprises an operational amplifier which has a non-inverting input and an inverting input which is connected to zero potential via a first resistor, and also comprises a second resistor and a third resistor whose interconnected ends form one input of the summing/subtraction member, one of the separate ends thereof being connected to the non-inverting input while the other separate end is connected to the inverting input of the operational amplifier, as well as a fourth resistor and a fifth resistor whose interconnected ends form the other input of the summing/subtraction member, one of the separate ends thereof being connected to the non-inverting input while the other separate end is connected to the non-inverting input of the operational amplifier. The output of the operational amplifier forms the output of the summing/subtraction member, the non-inverting input of the operational amplifier being connected to zero potential via a resistor while its inverting input is connected to its output via a resistor. The advantage consists in that by a suitable choice of the resistance ratios, constants can be adjusted in the summing/subtraction member which serve on the one hand to correct the temperature-independent zero point shift and on the other hand to produce a temperature-dependent zero point shift for compensation of undesirable drift, and finally to correct the temperature sensitivity as required.

In a further preferred embodiment in accordance with the invention, the output subtraction member comprises (a.) an operational amplifier having a non-inverting input and an inverting input; (b.) a first resistor and a second resistor whose interconnected ends are connected to the non-inverting input of the operational amplifier, the separate end of the first resistor forming a first input and the separate end of the second resistor forming the further input of the output subtraction member; (c.) a third resistor and a fourth resistor whose interconnected ends are connected to the inverting input of the operational amplifier, the separate end of the third resistor forming a second input while the separate end of the fourth resistor also forms the further input of the output subtraction member, a separate end of the second resistor and the fourth resistor reciprocally forming the respective further input in a predetermined manner, the other separate end being connected to zero potential. The non-inverting input of the operational amplifier is connected to zero potential via a resistor while its inverting input is connected to its output via a resistor.

In a preferred embodiment in accordance with the invention, the controller includes an operational amplifier whose non-inverting input is connected to the output of a generator for generating a fixed controller input d.c. voltage, its inverting input being connected, via an input resistor, to the output of the summing/subtraction member which supplies the other controller input d.c. voltage. The inverting input of the operational amplifier is connected, via a capacitor, to its output which forms the controller output.

Finally, the generator for generating a fixed controller input d.c. voltage preferably consists of a zener diode and a capacitor which is connected parallel thereto, one pole thereof carrying zero potential while their other pole forms the generator output wherefrom a predetermined d.c. voltage can be derived from a supply voltage applied via a resistor. This simple construction of the circuit for generating the fixed controller input d.c. voltage, however, can be replaced by an integrated voltage controller for given purposes when it is necessary to derive a very constant reference d.c. voltage from a substantially fluctuating supply voltage.

BRIEF DESCRIPTION OF THE DRAWINGS

An embodiment in accordance with the invention will be described in detail hereinafter with reference to the drawing, in which.

DESCRIPTION OF THE PREFERRED EMBODIMENTS

Figure 1:
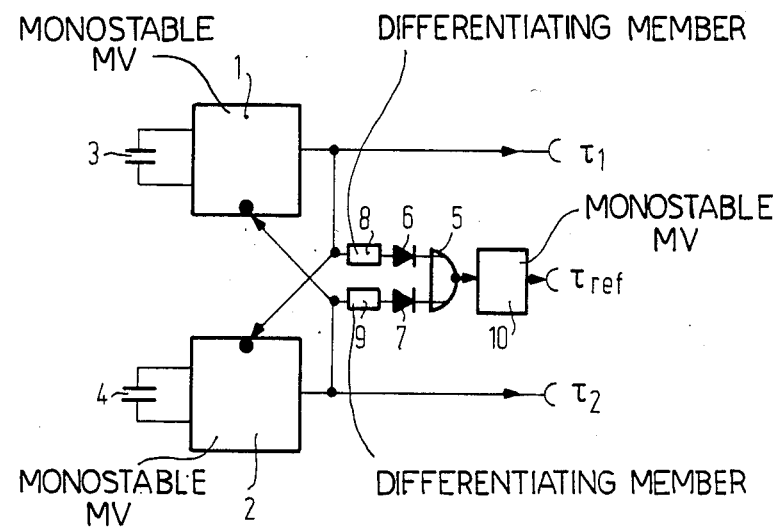
FIG. 1 shows a converter circuit for capacitive differential pressure sensors.

An evaluation circuit for a capacitive sensor is shown in FIG. 1. It comprises an oscillator which consists of a first and a second monostable multivibrator 1 and 2. The multivibrators 1, 2 are connected as a ring, i.e. the output of each multivibrator is connected to the inverting input of the other multivibrator. Measuring capacitors 3, 4 are connected to the multivibrators 1 and 2, respectively, so that the monostable multivibrators 1, 2 supply pulses having a duration which is proportional to the capacitance of the measuring capacitors 3, 4. Moreover, the outputs of the monostable multivibrators 1, 2 are connected to pulse duration demodulators 11 and 12 to be described hereinafter with reference to FIG. 2, said demodulators generating d.c. voltages from the pulses supplied by the multivibrators. The values of said d.c. voltages are equal to the reciprocal value of the duration of the pulses supplied by the multivibrators.

The two inputs of a NOR-gate 5 are connected, via a respective rectifier diode 6, 7 and a respective differentiating member 8, 9, to the outputs of the first and the second monostable multivibrators 1, 2, respectively. The output of the NOR-gate 5 is connected to the inverting input of a third monostable multivibrator 10.

Figure 3:
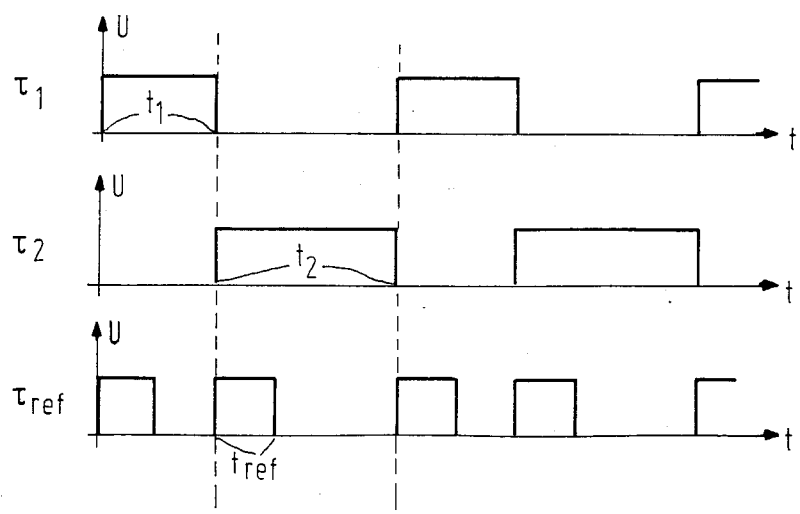
FIG. 3 shows a pulse diagram illustrating the time-modulated input signals in relation to a control signal derived from the oscillators.

The period of time during which the monostable multivibrator 10 is switched on is shorter than that of the monostable multivibrators 1, 2, the multivibrator 10 being sampled, via the NOR-gate 5, at double the frequency with respect to the monostable multivibrators 1 and 2, see the pulse diagrams in FIG. 3 in which $\tau_1$, $\tau_2$ and $\tau_{ref}$ denote the output signals of the first, the second and the third multivibrators 1, 2 and 10, respectively.

Figure 2:
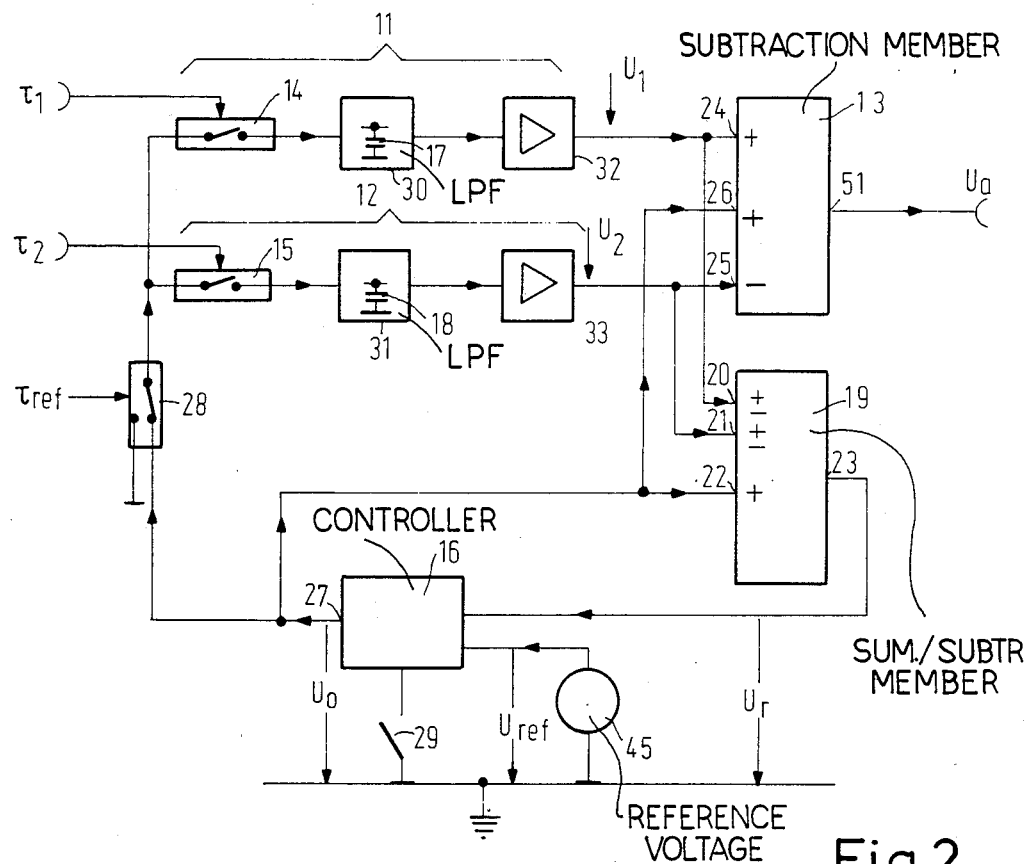
FIG. 2 shows a block diagram of the circuit arrangement for drift compensation.

The width of the signals $\tau_1$ and $\tau_2$ is a measure of the physical quantity picked up by the sensor. The additionally generated auxiliary signal $\tau_{ref}$ is necessary for generating corresponding d.c. voltages by means of the pulse duration demodulators 11, 12 (FIG. 2).

The converter circuit for capacitive differential pressure sensors converts the pulse-width modulated sensor signals, being proportional to $C_1$ and $C_2$, respectively, into d.c. voltages which are proportional to $1/C_1$ and $1/C_2$, respectively. In the case where no compensation is applied, their evaluation formula is:

$$U_a \sim 1/C_1 - 1/C_2$$

This output signal has a temperature-independent and a temperature-dependent zero point shift. Moreover, the sensitivity is temperature-dependent. In order to eliminate these effects, the following signal is also taken into account in the evaluation:

$$U_s \sim 1/C_1 + 1/C_2.$$

This signal is independent of the differential pressure acting on the sensor, but depends strongly on the temperature. For the correction of the temperature-dependent zero point shift, the temperature signal $U_s$ is weighted by a constant factor $K_a$, after which it is subtracted from $U_a$. $K_a$ is chosen so that the drift of $U_a$ and that of the temperature signal cancel one another. The temperature-independent zero point shift is corrected by subtracting a constant signal. The temperature-dependent sensitivity is corrected by dividing the signal $U_a$ by the strongly temperature-dependent signal $U_s$, $U_s$ also being weighted by corresponding factors. For example, when the temperature effect of the signal $U_a$ increases with a constant differential pressure, the weighted, strongly temperature-dependent signal $U_s$ also increases. The quotient of these two signals, however, remains constant.

The basic construction of the circuit arrangement and its function will be described with reference to the block diagram of FIG. 2 in conjunction with the pulse diagram of FIG. 3. The signals $\tau_1$ and $\tau_2$ supplied by the capacitive differential pressure sensor shown in FIG. 1 are squarewave signals. The widths of the pulses are proportional to the sensor capacitances $C_1$ and $C_2$, respectively. Moreover, the circuit shown in FIG. 1 generates a pulse signal $\tau_{ref}$ which has a constant pulse duration $t_{ref}$.

The circuit arrangement includes two pulse duration demodulators 11, 12 which extract d.c. voltages from the pulse signals, said d.c. voltages being subtracted in an output subtraction member 13. The pulse duration demodulators 11, 12 are formed by respective electrically controllable switches 14, 15, low-pass filters 30, 31, uncoupling amplifiers 32, 33. The construction of the two pulse duration demodulators 11, 12 is identical. The two input contacts of the switches 14, 15 are connected in common to an electrically controllable further switch 28 whose rest contact is connected to zero potential, its switch-on contact being connected to the output 27 of a controller 16 whose operation will be described in detail hereinafter.

The signals $\tau_1$, $\tau_2$ represent the pulse duration modulated signals corresponding to the sensor capacitances $C_1$ and $C_2$, respectively. During the period $t_1$, a high signal is present on the switch 14. Thus, during the period $t_{ref}$ the output voltage $U_0$ of the controller 16 reaches the low-pass filter 30 via the switch 28 and the switch 14. After expiration of the period $t_{ref}$, the switch 28 is switched over, so that zero potential is applied to the input of the low-pass filter 30. After expiration of the period $t_1$, the switch 14 is opened, so that charge can neither be applied to nor drained from the charging capacitor 17 present in the low-pass filter 30. During the period $t_1$, the charging capacitor 17 is thus charged for the period $t_{ref}$ and discharged for the remaining period. The mean d.c. voltage then arising across the capacitor 17 is:

$$\begin{aligned}
U_1 &= (t_{ref}/t_1) \cdot U_0 \\
t_1 &= K' \cdot C_1 \\
K' &= \text{conversion factor for the preceding electronic devices} \\
C_1 &= \text{sensor capacitance}
\end{aligned}$$

Thus:

$$U_1 = t_{ref} 1/(K' \cdot C_1) \cdot U_0. \tag{1}$$

The uncoupling amplifier 32 which follows the low-pass filter 30 has a very high-ohmic input resistance, so that the charging capacitor 17 in the low-pass filter 30 cannot be discharged via the uncoupling amplifier 32.

The operation of the other pulse duration demodulator 12, consisting of the switch 15, the low-pass filter 31 which includes a charging capacitor 18, and the subsequent uncoupling amplifier 33, corresponds to that of the pulse duration demodulator 11. Thus, a corresponding d.c. voltage is obtained on the output of the uncoupling amplifier 33 as follows:

$$U_2 = t_{ref} 1/(K' \cdot C_2) \cdot U_0. \tag{2}$$

The outputs of the pulse duration demodulators 11, 12, formed by the outputs of the uncoupling amplifiers 32, 33, are connected to a respective input 24, 25 of an output subtraction member 13. Moreover, both outputs of the pulse duration demodulators 11, 12 are connected to a respective input 20, 21 of a summing/subtraction member 19. A third input 26 of the output subtraction member 13 and a third input of the summing/subtraction member 19 are connected to the output 27 of the controller 16.

In principle, it holds for such known summing/subtraction members 19 that a d.c. voltage occurs on their output 23 as follows:

$$U_r = K_3 \cdot U_0 \pm K_4 U_1 \pm K_5 U_2 \tag{3}$$

where $K_3$, $K_4$ and $K_5$ are coefficients which are realized by means of resistors in the summing/subtraction member 19. This will be described in more detail hereinafter with reference to an actual circuit arrangement.

The voltage $U_r$ formed on the output 23 of the summing/subtraction member 19 is applied to the controller 16 which compares this voltage with a fixed reference voltage $U_{ref}$ which is generated by a reference voltage generator 45. The d.c. voltage $U_0$ is present on the output of the controller 16. The controller 16 re-adjusts the d.c. voltage $U_0$ so that $U_r = U_{ref}$. Thus, utilizing (1), (2) and (3):

$$U_{ref} = K_3 U_0 \pm K_4 \cdot t_{ref} 1/(K' \cdot C_1) \cdot U_0 \pm K_5 \cdot t_{ref} 1/(K' \cdot C_2) U_0$$

and $$U_0 = U_{ref} \frac{1}{K_3 \pm K_4 K/C_1 \pm K_5 K/C_2} \tag{4}$$

where $$K = t_{ref}/K'. \tag{5}$$

The output subtraction member 13 is also a summing-/subtraction member with adjustable coefficients. The output signals $U_a$ on the output 51 of the output subtraction member 13, and hence the output signal of the overall circuit arrangement, is:

$$U_a = \pm K_0 U_0 + K_1 U_1 - K_2 U_2.$$

Utilizing (1), (2), (4) and (5):

$$U_a = U_{ref} \frac{\pm K_0 + K_1 K/C_1 - K_2 K/C_2}{K_3 \pm K_4 K/C_1 \pm K_5 K/C_2} \quad (6)$$

$U_a \sim \Delta P.$ $U_{ref}$ = reference voltage
K = fixed conversion factor for the sensor capacitances
$K_0$ to $K_5$ = electronically adjustable coefficients
$\Delta P$ = differential pressure of the sensors.

The constants can be realized by way of the resistance ratios in the summing/subtraction members 13, 19. $K_0$ serves to correct the temperature-independent zero point shift. In a first approximation, the term $$K_1 K/C_1 - K_2 K/C_2$$

is proportional to the differential pressure acting on the sensor. Moreover, this term generally produces a temperature-dependent zero point shift when $K_1 = K_2$.

By a slight variation of $K_1$ and $K_2$, however, an additional temperature drift is generated, which counteracts the undesirable drift so that overall compensation is achieved. The term in the denominator:

$$\pm K_4 K/C_1 \pm K_5 K/C_2$$

is also slightly temperature-dependent, where initially $K_4 = K_5$. The dependency can be adjusted by variation of $K_4$ and $K_5$ with respect to $K_3$. Thus, the temperature drift of the sensitivity of the numerator of the equation (6) can be corrected. For example, when the "numerator signal" in (6) increases due to a temperature variation, the "denominator signal" in (6) is re-adjusted to the same extent. The quotient, and hence the output signal $U_a$, remains constant.

The controller 16 comprises a switch 29 whereby the controller 16 can be switched on and off. When the controller 16 is de-activated by the switch 29 in order to enable trimming of the circuit, the d.c. voltage $U_0$ on the controller output 27 remains constant. For two different temperatures, the voltages $U_1$, $U_2$ are then measured in the no-load condition and the loaded condition of the sensor. The sensor-imposed temperature-dependent variation of the voltages $U_1$ and $U_2$ is recorded. The constants $K_0 - K_5$ can be determined therefrom by means of a mathematical operation. These constants are realized by means of appropriate resistors in the output subtraction member 13 and the summing-/subtraction member 19 and ensure that the output signal $U_a$, referred to the temperature, is compensated for.

In addition to temperature compensation, this circuit arrangement is also capable of linearizing the output signal $U_a$. The output signal $U_a$ of the output subtraction member 13 normally comprises a slight nonlinear component, i.e. it varies not strictly proportionally to the differential pressure acting on the sensor. The output signal $U_r$ of the summing/subtraction member 19 used for correcting the temperature-dependent variation is independent of the differential pressure when the two constants $K_4$ and $K_5$ are equal. The non-linearity of the output signal $U_r$ can be reduced by way of a slightly different adjustment of the constants $K_4$ and $K_5$. A slight differential pressure dependency is then imposed on the output signal $U_r$ of the summing/subtraction member 19 and hence also on the signal $U_0$ on the output of the controller 16. For example, when the output signal $U_a$ of the output subtraction member 13 increases beyond proportion with respect to the differential pressure, the signal $U_0$ on the controller output 27 is adjusted by means of the constants $K_4$ and $K_5$ so that it decreases in proportion as the differential pressure increases. Because the output signal $U_a$ of the output subtraction member 13, however, is directly dependent on the signal $U_0$ on the controller output 27, the over-proportional increase is corrected for by feeding back this signal to the input 26 of the output subtraction member 13 and to the input 22 of the summing/subtraction member 19.

Figure 4:
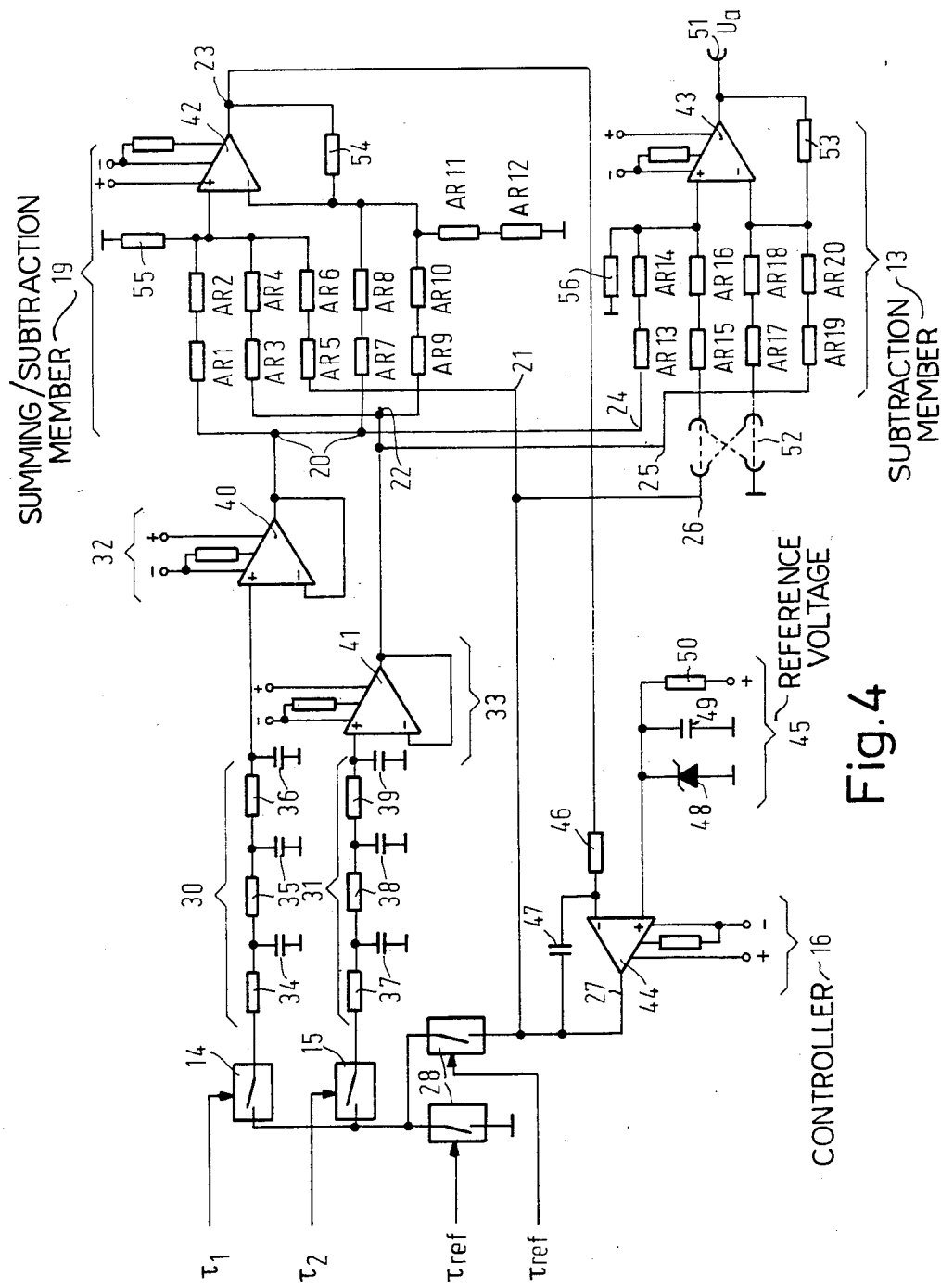
FIG. 4 shows a complete circuit diagram of the circuit arrangement shown in FIG. 2.

The circuit arrangement shown in FIG. 2 and described with reference to its block diagram may have the specific construction which is shown in FIG. 4 by way of example. The pulse duration demodulators 11, 12 are again formed by an electrically controllable switch 14, 15, a low-pass filter 30, 31 as well as by high-ohmic uncoupling amplifiers 32, 33 which are connected in series. The inputs of the switches 14, 15 are connected together to the output contact of the electrically controllable switch 28 which consists of two separate switches which are alternately activated by a reference signal $\tau_{ref}$ and $\overline{\tau_{ref}}$, respectively, so that this switch 28 operates in exactly the same way as the three-pole switch 28 shown in FIG. 2. The difference signals $\tau_{ref}$ and $\overline{\tau_{ref}}$ are derived, as has already been described, from the circuit shown in FIG. 1 which precedes the circuit in accordance with the invention and which derives time-modulated signals $\tau_1$ and $\tau_2$ from the capacitance variations of the sensors.

These time-modulated sensor signals $\tau_1$ and $\tau_2$ are applied to the switches 14 and 15, respectively, and determine, in the described manner, the period of time during which the switches 14, 15 are closed as a function of the duration of the sensor signals.

Each of the low-pass filters 30, 31 consists of three filter members 34, 35, 36 and 37, 38, 39 respectively, which are successively connected in known manner. Each of these members consists of a resistor in its longitudinal branch and a capacitor in its transverse branch which is unilaterally connected to zero potential.

The uncoupling amplifiers 32, 33 are formed by operational amplifiers 40, 41 whose non-inverting input is connected to the output of the low-pass filters 30, 31. The inverting input of the uncoupling amplifiers 40, 41 is fed back to the output of the uncoupling amplifiers 40, 41. Furthermore, the operational amplifiers 40, 41 are connected to suitable supply voltage sources in known manner. The outputs of the uncoupling amplifiers 32, 33, being formed by the outputs of the operational amplifiers 40, 41 in the present circuit, are connected to the respective inputs 20, 22 of the summing/subtraction member 19. The summing/subtraction member 19 is formed by a resistor network AR 1–AR 12 which is connected to an operational amplifier 42. The non-inverting input of the operational amplifier 42, being connected to zero potential via a resistor 55, is connected, via a series connection of two resistors AR 1, AR 2, to the input 20 and, via a series connection of the resistors AR 3 and AR 4, to the input 22. The inverting input of the operational amplifier 42 is connected to the input 20 via a series connection of the resistors AR 7, AR 8 and to the input 22 via a series connection of the resistors AR 9 and AR 10. Moreover, the inverting input of the operational amplifier 42 is connected to zero potential via a series connection of the resistors AR 11 and AR 12.

Via a series connection of the resistors AR 5 and AR 6, the non-inverting input of the operational amplifier 42 is connected, via the input 21 of the summing/subtraction member 19, to the output 27 of the controller 16 which is formed essentially by an operational amplifier 44 in the present case.

Moreover, the outputs of the pulse duration demodulators 11, 12, i.e. the outputs of the operational amplifiers 40, 41, are connected to the inputs 24, 25 of the output subtraction member 13. The output subtraction member 13 is formed by a resistor network AR 13–AR 20 and an operational amplifier 43. The non-inverting input of the operational amplifier 43, being connected to zero potential via a resistor 56, is connected to the input 24 via a series connection of the resistors AR 13 and AR 14. The inverting input of the operational amplifier 43 is connected, via a series connection of the resistors AR 19 and AR 20, to the other input 25 of the output subtraction member 13. Moreover, the non-inverting input of the operational amplifier 43 can be connected, via a series connection of the resistors AR 15 and AR 16 and a cross-switch 52, to the further input 26 of the output subtraction member 13. Similarly, the inverting input of the operational amplifier 43 can be connected to the further input 26 of the output subtraction member 13, via a series connection of the resistors AR 17 and AR 18 and the cross-switch 52. The cross-switch 52 enables either the series connection of the resistors AR 15 and AR 16 to be connected to zero potential when the other series connection of the resistors AR 17 and AR 18 is connected to the input 26 of the output subtraction member 13, or to connect the series connection of the resistors AR 17 and AR 18 to zero potential when the series connection of the resistors AR 15 and AR 16 is connected to the input 26 of the output subtraction member 13. Both resistor series connections can thus form the input 26, the other series connection being each time connected to zero potential.

The output of the operational amplifier 43 is connected to the inverting input of the operational amplifier 43 via a resistor 53. The output of the operational amplifier 43 also forms the output 51 of the overall circuit arrangement.

The output 23 of the summing/subtraction member 19, in this case formed by the output of the operational amplifier 42, is connected to the inverting input of the operational amplifier 42 via a resistor 54 and is also connected, via a resistor 46, to the inverting input of the operational amplifier 44 which essentially forms the controller 16. The operational amplifier 44 now operates as a comparator which compares two input voltages. The inverting input of the operational amplifier 44 is connected, via a capacitor 47, to the output of the operational amplifier 44 which forms the controller output 27. The non-inverting input of the operational amplifier 44 is connected to the output of a reference voltage generator 45 for generating a fixed reference voltage. The controller output 27, or the output of the operational amplifier 44, is connected to the input 26 of the output subtraction member 13 and to the input 21 of the summing/subtraction member 19 as well as to the switch-on contact of the switch 28. The rest contact of the switch 28 is connected to zero potential, the output contact being connected, as had already been described, with the first switching contacts of the switches 14, 15.

The generator 45 for generating a fixed controller input voltage includes a zener diode 48 as well as a capacitor 49, one terminal of each of which is connected to zero potential, their other terminal being connected to the non-inverting input of the operational amplifier 44. Via a resistor 50, a d.c. voltage is applied to the cathode side of the junction between the capacitor 49 and the zener diode 48, so that a fixed reference voltage is formed on the non-inverting input of the operational amplifier 44.

The constants $K_3$, $K_4$ and $K_5$ are adjusted by means of the resistors AR 1 to AR 12. When the sign of $K_4$ and $K_5$ is positive, the resistors AR 7 to AR 10 are omitted, and in the case of a negative sign the resistors AR 1 to AR 4 are omitted. A temperature-compensated output voltage $U_a$ is thus obtained on the output 51 of the output subtraction member 13.

The described circuit arrangement enables conversion of pulse-width modulated sensor signals into a d.c. voltage signal such that on the one hand the temperature-imposed errors of the sensor are compensated for and that on the other hand the differential pressure-dependent output signal, or the output voltage $U_a$, can also be linearized.

What is claimed is:

1. A circuit arrangement for the compensation of temperature-dependent and temperature-independent drift and for the compensation of the sensitivity of a capacitive sensor, comprising: two measuring capacitors, connected to at least one oscillator which outputs pulses of a duration proportional to the capacitance of the capacitors, the pulses arising from the respective capacitances appearing in an alternating fashion, comprising a circuit for generating reference pulses from the pulses arising from the respective capacitances, the duration of the reference pulses being shorter than the duration of the pulses from the respective capacitances, a pulse duration demodulator associated with a respective capacitance and which forms, from the pulses applied, a d.c. signal which corresponds to the relevant reciprocal value of a capacitance in that during a first period $t_{ref}$ which depends on the duration of a reference pulse a first reference signal is up-slope integrated and during a second period, after expiration of the reference pulse, a second reference signal is down-slope integrated, and an output subtraction member which forms the difference between the two output signals of the pulse duration demodulators, characterized in that one output of the pulse duration demodulators is connected to a respective input of a summing/subtraction member whose output supplies a controller, supplying the first reference signal, with an input d.c. signal ($U_r$), a d.c. signal ($U_0$) of the controller output, which is connected to a further input of the summing/subtraction member and to a further input of the output subtraction member, being re-adjusted so that the controller input d.c. signal ($U_r$) on the output of the summing/subtraction member is equal to a reference signal ($U_{ref}$).

2. A circuit arrangement as claimed in claim 1, characterized in that the input circuit of the pulse duration demodulators includes a respective electrically controllable switch which supplies, each time in accordance with the pulse duration ($t_1$, $t_2$) of the oscillator output pulses ($\tau_1$, $\tau_2$), a charging capacitor of the pulse duration demodulator with the controller output d.c. voltage ($U_0$) in order to charge said capacitor during a period $t_{ref}$ which depends on the duration of the reference pulse, and which applies zero potential thereto, after expiration of the period $T_{ref}$, in order to discharge said capacitor.

3. A circuit arrangement as claimed in claim 2, characterized in that a connection between the controller output and the controllable switches includes an electrically controllable further switch whose rest contact carries zero potential and by means of which, using a pulse signal ($\tau_{ref}$) derived from the oscillators, and duration $t_{ref}$ of the charging and the duration of the discharging of the relevant charging capacitor can be determined by appropriate switching of the further switch.

4. A circuit arrangement as claimed in claim 3 further comprising a switch connected to the controller for switching the controller on and off.

5. A circuit arrangement as claimed in claim 2, characterized in that the controller is connected to a switch (29) for switching the controller on and off.

6. A circuit arrangement as claimed in claim 1, characterized in that the pulse duration demodulator comprises a low-pass filter which includes the charging capacitor and three successively connected filter elements; an uncoupling amplifier which has a high input resistance and which consists of a non-inverting operational amplifier.

7. A circuit arrangement as claimed in claim 1, characterized in that the summing/subtraction member comprises an operational amplifier which has a non-inverting input and an inverting input which is connected to zero potential via a first resistor, a second resistor and a third resistor whose interconnected ends form one input of the summing/subtraction member, one of the separate ends thereof being connected to the non-inverting input and the other separate end being connected to the inverting input of the operational amplifier, a fourth resistor and a fifth resistor having interconnected ends forming the other input of the summing/subtraction member, one of the separate ends thereof being connected to the non-inverting input while the other separate end is connected to the inverting input of the operational amplifier, an output of the operational amplifier forming the output of the summing/subtraction member, the non-inverting input of the operational amplifier being connected to zero potential via a sixth resistor and its inverting input being connected to its output via a seventh resistor.

8. A circuit arrangement as claimed in claim 1, characterized in that the output subtraction member comprises:
(a) an operational amplifier having a non-inverting input and an inverting input;
(b) a first resistor and a second resistor whose interconnected ends are connected to the non-inverting input of the operational amplifier, a separate end of the first resistor forming a first input and a separate end of the second resistor forming the further input of the output subtraction member;
(c) a third resistor and a fourth resistor whose interconnected ends are connected to the inverting input of the operational amplifier, a separate end of the third resistor forming a second input while the separate end of the fourth resistor also forms the further input of the output subtraction member, a separate end of the second resistor and the fourth resistor reciprocally forming the respective further input, the other separate end being connected to zero potential, the non-inverting input of the operational amplifier being connected to zero potential via a fifth resistor while its inverting input is connected to its output via a resistor.

9. A circuit arrangement as claimed in claim 1, characterized in that the controller (16) includes an operational amplifier which operates as a comparator and whose non-inverting input is connected to the output of a generator for generating a fixed controller input d.c. voltage ($U_{ref}$), its inverting input being connected, via an input resistor, to the output (23) of the summing/subtraction member which supplies the other controller input d.c. voltage ($U_r$), the inverting input of the operational amplifier being connected, via a capacitor, to its output which forms the controller output.

10. A circuit arrangement as claimed in claim 9, characterized in that the generator for generating a fixed controller input d.c. voltage ($U_{ref}$) includes a zener diode and a second capacitor connected parallel thereto, one pole thereof carrying zero potential while the other pole forms the generator output wherefrom a predetermined fixed d.c. voltage ($U_{ref}$) is derived from a supply voltage applied via a resistor.

* * * * *